Oct. 13, 1964    R. G. THEODORE ETAL    3,153,140
RADIANT HEATING PANEL
Filed Sept. 12, 1961

INVENTORS:
Ralph G. Theodore
John L. Davis
By
Stary, Desmond & Parker   Attys 3,153,140
RADIANT HEATING PANEL
Ralph G. Theodore, Georgetown, Ky., and John L. Davis, Indianapolis, Ind., assignors to Electric Parts Corporation, Georgetown, Ky., a corporation of Illinois
Filed Sept. 12, 1961, Ser. No. 137,559
2 Claims. (Cl. 219—549)

This invention relates to improvements in a radiant heating panel or sheet which essentially is constructed of an insulated electric resistance wire heat sealed to one or between two carrier sheets or foils.

The application is a continuation-in-part of our co-pending application Serial No. 815,346, filed May 25, 1959, and now Patent No. 3,010,007.

One of the important features of the invention resides in a radiant heating panel or sheet which is extremely flexible permitting use where more resilient and bulky panels cannot be used.

Another important feature of the invention resides in a radiant heating panel or sheet which may be manufactured economically and yet the structure is sturdy and safe to use.

A further important feature of the invention resides in a radiant heating panel wherein the radiant panel members comprise flexible sheet film or foil having an inner face comprising a heat-responsive plastic and a resistance wire having a flexible insulating sheath comprising the same or a complementary heat-responsive plastic, and wherein the wire is intimately and firmly, yet simply and economically, bonded to the sheet by fusing the plastic materials.

Other objects, advantages and features of the present invention will be more apparent from the accompanying drawing and following detailed description.

Figure 1:
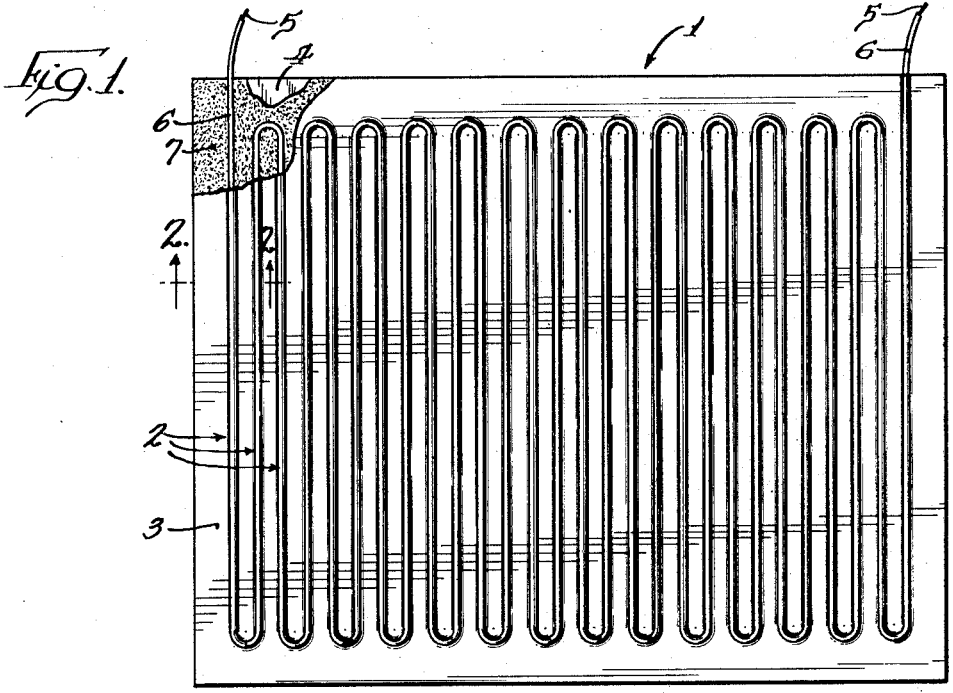
FIG. 1 is a face view of a radiant heating panel or sheet embodying the features of the present invention.

Referring in detail to the drawing, 1 indicates generally a radiant heating panel or sheet embodying the features of the present invention. The panel 1 comprises essentially a heating unit 2 bonded to a flexible carrier sheet, or sandwiched between two such sheets 3 and 4.

The heating unit 2 comprises conventional resistance wire 5 sheathed by an insulating material 6. The insulating material comprises a flexible material, preferably polyvinyl chloride or similar plastic material or mixture which will withstand temperatures up to about 220° F. without melting or distintegrating. The heating unit is arranged in a zigzag or serpentine fashion conventional in the arrangements used in heating panels, electric blankets, electric sheets or the like so that the pattern employed will produce heat over a relatively large area.

Figure 2:
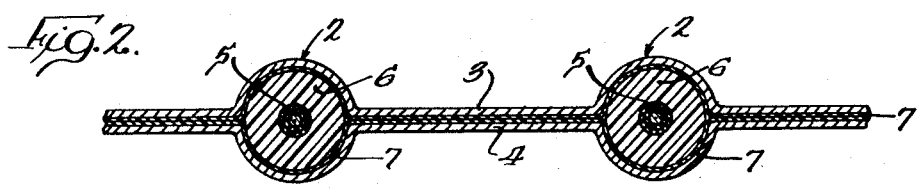
FIG. 2 is an enlarged detailed sectional view taken on line 2—2 of FIG. 1, certain parts being exaggerated in size.
Figure 3:
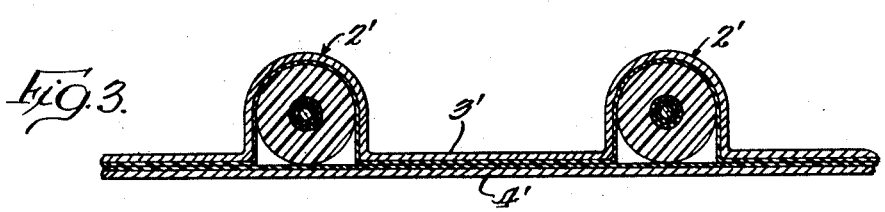
FIG. 3 is a sectional view similar to FIG. 2 showing a modification.
Figure 4:
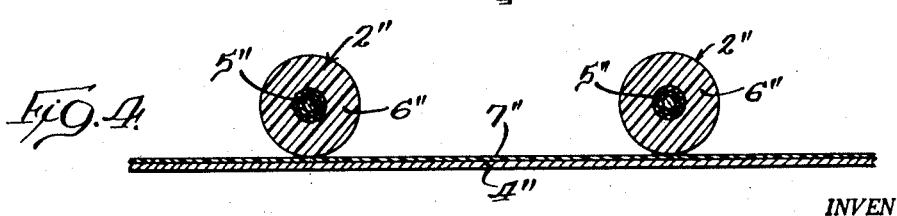
FIG. 4 is a sectional view of a further modification.

Whether the carrier is comprised of two sheets, as shown in FIGS. 1 to 3, or one sheet, as shown in FIG. 4, each comprises a thin flexible sheet, film or foil having at least one face comprising a heat-responsive plastic material. The preferred sheet is metal foil having a thin plastic coating on one face. Other materials include plastic-coated paper, cardboard and cloth and plastic films per se. The foil used is preferably aluminum foil having highly efficient radiant energy-reflecting surfaces. Preferably the foil thickness or caliper is less than about three-thousandths of an inch. Of course, heavier foil may conceivably be used so long as the foil sheets are reasonably flexible and do not, when used in pairs, appreciably bridge adjacent wires of the heating unit when said wires are sandwiched between the radiant sheets, as will be hereinafter more fully described.

In FIGS. 1 and 2, the heating unit wires 2 are sandwiched between the two opposite sheets 3 and 4. As a feature of the present invention, the inner or confronting faces of the sheets 3 and 4 comprise (as with plastic films), or are coated with a relatively thin coating 7 of, a heat-responsive plastic adhesive, preferably polyvinyl chloride or similar plastic material complementary to the insulating sheath on the wire, the coating 7 in FIG. 2 being shown in exaggerated thickness.

Thereafter a heated member, such as a heated roll, iron or plate (not shown) is rolled or passed over or pressed against each side of the composite sheet or panel and the coated faces of the sheets 3 and 4 are secured together and secured to the surface of the insulation 6. By virtue of the flexible character of the foil sheets, the sheets may be brought into intimate contact with each other and with the major portion of the outer surface area of the insulation 6. That is, no appreciable bridging of the sheets 3 and 4 will take place between adjacent wires or conductors of the heating unit.

The preferred manner of sandwiching the heating unit between the sheets 3 and 4 is illustrated in FIG. 2 wherein the sheets 3 and 4 symmetrically sandwich the wires of the heating unit. However, if desired, the sheets may sandwich the heating unit wires as shown in FIG. 3, wherein sheet 4' is maintained substantially flat and sheet 3' is distorted to embrace the heating unit conductors 2'. For automatic or machine securement of the sheets together about the heating unit, one manner of securement may be preferred over the other. In either case, however, a minimum of bridging of the sheets over the conductors will occur.

Due to the compatibility of the heat-responsive plastics comprising the coatings 7 and the insulation 6, the two sheets 3 and 4 are intimately bonded to the portions of the insulation 6 contacted thereby and the contacted facial portions of the sheets are similarly bonded together positively to unite the components and secure the coil of wire.

In FIG. 4 embodiment of the invention, the intimacy and permanency of the bond acquired under heat between the carrier and the flat coil of wire is utilized to maximum advantage to provide an exceptionally economical radiant heating panel. As shown, this panel consists simply of the flat coil of insulated wire 2″ and a substantially flat single carrier sheet 4″ to which the wire is heat bonded. The sheet 4″, as previously described, may comprise a plastic-coated metal foil, plastic-coated paper, cardboard or cloth, or a film of the selected plastic, such as a thin polyvinyl chloride. While reference is made to polyvinyl chloride, it is appreciated that other materials may be employed and that the materials need not be the same, so long as they are complementary to one another. As used hereinafter, "complementary" is intended to include both the same material and other complementary materials.

To produce the panel of FIG. 4, a flat sinuous coil of the wire 2″ is laid out on a table or the like, a carrier sheet 4″ is laid on top of the coil with its coated or plastic face abutting the coil, and a heated member, such as a roller, iron or plate is pressed against or passed over the exposed upper face of the carrier to heat the face or coating 7 and the contacted portion of the sheath 6 to cause the two to fuse and be intimately bonded together. A suitable heat range is about 300–375° F. depending on the materials employed and the duration of heat application.

The result, in all of the disclosed embodiments, is an extremely flexible and exceptionally economical radiant heating panel of rugged construction capable of long service life. The bond effected between the plastic materials will readily survive for prolonged periods of use the normal range of panel heats.

Other obvious variations of the invention, which do not depart from the spirit of the invention, will occur to anyone skilled in the art and, hence, it is not intended that the invention be limited to the exact details shown and described except as necessitated by the appended claims.

What is claimed is:
1. A radiant heating panel comprising a flat sinuous coil of resistance wire having an insulating sheath of relatively flexible heat responsive plastic insulating material, and a foil-like carrier sheet disposed on one side only of said coil, said sheet having on the face thereof confronting said coil a coating of heat responsive plastic material complementary to the material of said sheath, said coil and said sheet being adhered together by a heat-sealed adhesive bond between said sheath and the confronting face of said sheet.

2. A radiant heating panel comprising a flat sinuous coil of resistance wire having an insulating sheath of relatively flexible heat responsive plastic insulating material, and a foil-like carrier sheet disposed on one side only of said coil, said sheet having on the face thereof confronting said coil a coating of heat responsive plastic material complementary to the material of said sheath, said coil and said sheet being adhered together by a heat-sealed adhesive bond between said sheath and the confronting face of said sheet, said sheet being selected from the group consisting of a film of plastic material complementary to the material of said sheath, and plastic coated metal foil, paper, cardboard and cloth.

References Cited in the file of this patent

UNITED STATES PATENTS

| | | |
|---|---|---|
| 2,423,196 | MacKendrick | July 1, 1947 |
| 2,529,914 | Challenner | Nov. 14, 1950 |
| 2,610,286 | Cox | Sept. 9, 1952 |
| 2,613,306 | Waltersdorf et al. | Oct. 7, 1952 |
| 2,715,674 | Abbott et al. | Aug. 16, 1955 |
| 2,741,692 | Luke | Apr. 10, 1956 |
| 2,767,113 | Bower | Oct. 16, 1956 |
| 2,845,519 | Willat | July 29, 1958 |
| 2,846,560 | Jacoby et al. | Aug. 5, 1958 |
| 2,862,097 | Negromanti | Nov. 25, 1958 |
| 2,889,445 | Wolf | June 2, 1959 |
| 2,900,290 | Bethge | Aug. 18, 1959 |
| 2,942,330 | Luke | June 28, 1960 |
| 2,956,915 | Korn et al. | Oct. 18, 1960 |
| 2,961,524 | Newman | Nov. 22, 1960 |
| 2,964,444 | Lynn | Dec. 13, 1960 |
| 2,990,607 | Negromanti | July 4, 1961 |
| 2,993,806 | Fisher et al. | July 25, 1961 |
| 3,010,007 | Theodore et al. | Nov. 21, 1961 |
| 3,056,768 | Foglia | Oct. 2, 1962 |